United States Patent [19]

Swift

[11] 4,066,910
[45] Jan. 3, 1978

[54] TRANSMISSIVITY-CODED DATA CARD SYSTEMS

[75] Inventor: David Merton Swift, Palo Alto, Calif.

[73] Assignee: Lawrence Systems, Inc., San Francisco, Calif.

[21] Appl. No.: 675,467

[22] Filed: Apr. 9, 1976

[51] Int. Cl.² .............................................. G06K 7/10
[52] U.S. Cl. .................................... 250/555; 235/454; 250/569; 235/488
[58] Field of Search ............... 250/555, 566, 568, 569, 250/214 AG, 222, 229; 235/61.11 E

[56] References Cited

U.S. PATENT DOCUMENTS

| 3,820,068 | 6/1974 | McMillin | 250/568 |
| 3,886,328 | 5/1975 | Harms et al. | 250/555 |
| 3,928,827 | 12/1975 | Kepka et al. | 250/569 |
| 3,949,233 | 4/1976 | Gluck | 235/61.11 E |

Primary Examiner—David C. Nelms
Attorney, Agent, or Firm—Schapp and Hatch

[57] ABSTRACT

A photoelectric data card system is disclosed in which the cards are transmissivity-coded, so that light of a particular wave length and intensity is transmitted in varying degrees of different code digit representing areas of the cards, and thus the intensity of the light emerging from each of these code digit representing areas can be photoelectrically interpreted as the value of the digit represented by that area. A laminated card for use in this system is disclosed in which the transmissivity levels of the digit representing areas are provided by halftone printing on an inner lamination of dark-pigmented plastic card stock, and the inner lamination is sealed between two white-pigmented laminations of plastic card stock, the white-pigmented laminations being pigmented to such an extent that neither the location of the digit representing areas nor the values of the digits represented can be determined by casual inspection of the card. The card reader of the disclosed system includes a light source-photosensor digit reading pair for each digit representing area to be read and an additional light source-photosensor reference pair for determining the transmissivity of a reference area of the card. In order to eliminate the reading errors arising from batch-to-batch variations in the transmissivity of available card stock materials, the reference voltage levels with which the output signals of the digit reading circuits are compared for classification as to digit value are all proportionately varied in accordance with the magnitude of the output signal from the reference pair. Reading errors due to printing variations from card to card may be reduced by providing a standard transmissivity imprint at the reference area during the same printing operation by which the digit value imprints are made.

20 Claims, 3 Drawing Figures

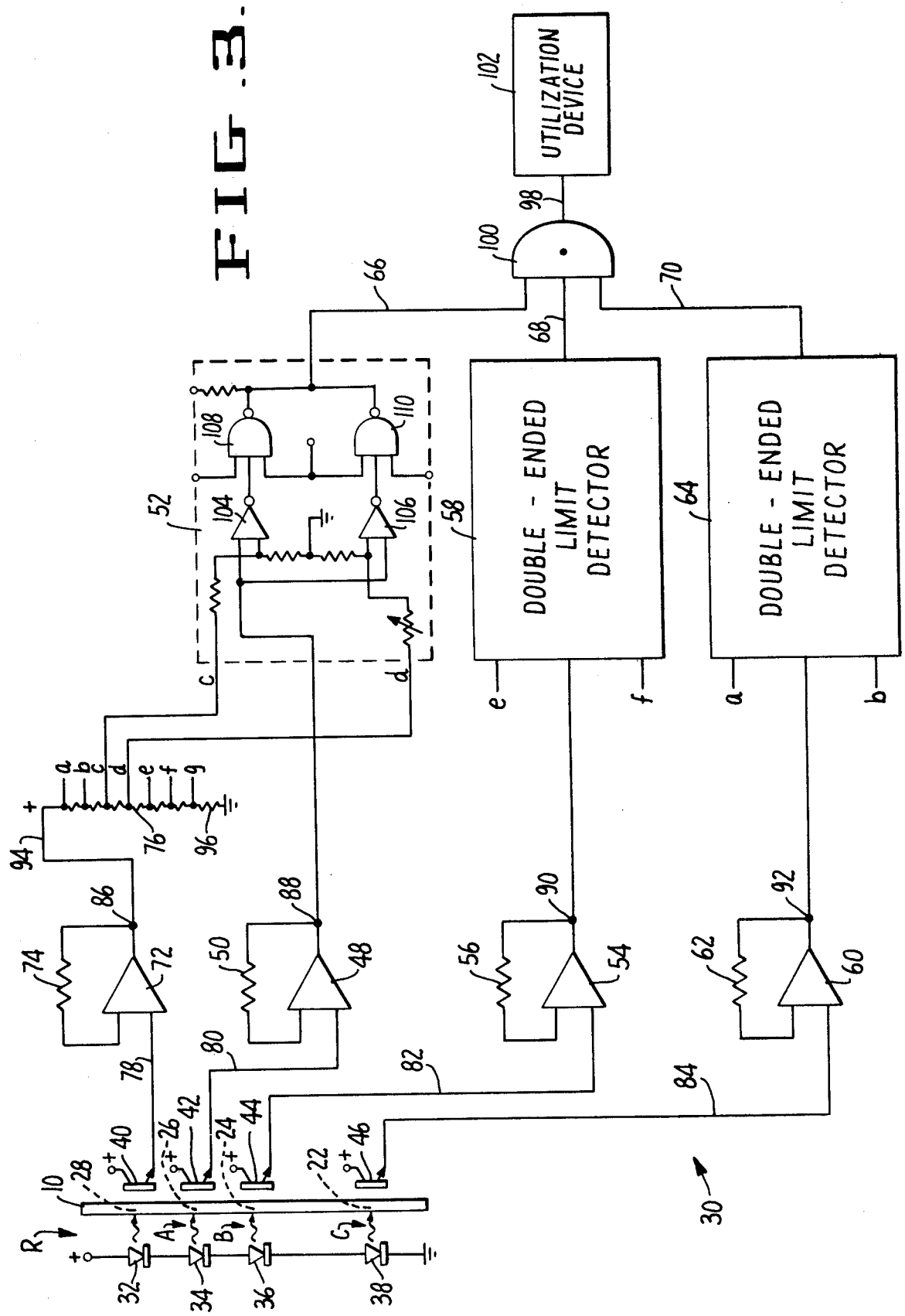

TRANSMISSIVITY-CODED DATA CARD SYSTEMS

BACKGROUND OF THE INVENTION

1. Field of the Invention

The present invention relates to photoelectric data card systems in which the cards are transmissivity-coded, and more particularly to improved transmissivity-coded photoelectric data card systems in which novel and inventive means are provided for reducing or eliminating reading errors arising from batch-to-batch variations in the transmissivity of commercially available card stocks, and for reducing reading errors arising from card-to-card code imprinting variations, thus increasing the practically realizable number of reader-distinguishable digit values, and making it possible to produce cards with a minimum of expensive, time consuming hand labor steps, and without using special chemical techniques.

2. Description of the Prior Art

Transmissivity-coded photoelectric data card systems are well known in the prior art.

A transmissivity-coded photoelectric key-card system is shown and described in U.S. Pat. No 3,029,345, issued to David W. Douglas on Apr. 10, 1962. Another such system is shown and described in U.S. Pat. No 3,383,513, issued to the same inventor on May 14, 1968.

Card constructions for transmissivity-coded key-cards are shown and described in U.S. Pat. No. 3,836,754, issued to Frederick D. Toye and Frederick N. Toye on Sept. 17, 1974.

A photoelectric reader for transmissivity-coded key-cards is shown and described in U.S. Pat. No. 3,875,375, issued to Thomas J. Scuitto and David C. Kramer on Apr. 1, 1975.

Actual working embodiments of prior art transmissivity-coded data card systems have been severely limited in the number of digit values, i.e., transmissivity levels, which could be correctly distinguished by their readers in mass produced cards from different production batches, making it necessary to increase the number of digit areas per card, and thus making the associated readers more complex and expensive than contemplated, and failing to realize the full potential of such systems.

In addition to thus increasing the number of digit areas per card above the optimum, workers in the transmissivity-coded data card art have also resorted to manual sampling of large numbers of mass produced cards, in order to find a small number of cards which would operate correctly with a particular reader or small group of readers. There is, of course, no guarantee that any such sampling will produce any particular number of usable cards, or indeed any usable cards at all.

The individual adjustment of a reader or a group of readers to match the transmissivity levels of a group of cards found to be alike in that respect by manual sampling is, of course, as expensive or more expensive than the manual selection of the cards by sampling.

As will be obvious to those having ordinary skill in the art, these cut-and-try expedients, involving considerable hand labor, and the increase of the number of digit areas per card, digit reading pairs per reader, etc., above the optimum, made the prior art transmissivity-coded data card systems in general as expensive or more expensive than the conventional "black-and-white" card systems, even with the added timing tracks and timing bit reading and translating means characteristic of "black-and-white" systems, and thus transmissivity-coded data card systems have not reached their full potential.

SUMMARY OF THE INVENTION

Accordingly, it is an object of the present invention to provide a transmissivity-coded data card system including a reader which is capable of reading mass produced cards despite wide-range variations in the transmissivity of card stock from batch-to-batch.

Another object of the present invention is to provide a transmissivity-coded data card system including a reader which is capable of reading cards which have been mass produced by conventional printing or silk-screening methods despite variations in the density of the printed code from card to card.

A further object of the present invention is to provide a transmissivity-coded data card system including a reader which is capable of reading more digit values, i.e., transmissivity levels, from mass produced key cards produced in different production runs than was possible with the readers of prior art transmissivity-coded data card systems.

Yet another object of the present invention is to provide transmissivity-coded data card systems characterized by large numbers of digit values and small numbers of digit areas, whereby large numbers of cards can be distinguished by a static reader, i.e., a reader which does not have the usual time track reading means.

A yet further object of the present invention is to provide readers for transmissivity-coded data cards which are simple, inexpensive to construct and maintain, and capable of being embodied in self-contained, stand-alone units which do not require to be interconnected with separate, remotely located computers, but rather produce pass-no-pass indications and corresponding electrical signals at their own output terminals without the aid of other circuits or apparatus than the usual alternating current supply connections.

Other objects of the present invention will in part be obvious and will in part appear hereinafter.

The present invention, accordingly, comprises the features of construction, combinations of elements, and arrangements of parts, which will be exemplified in the constructions hereinafter set forth, and the scope of the invention will be indicated in the appended claims.

In accordance with a principal feature of the present invention, a photoelectric reader for transmissivity-coded data card includes a light source-photosensor reference pair for determining the transmissivity or percent transmission of a reference area of each card presented to it.

In accordance with another principal feature of the present invention, such a photoelectric reader is provided with reference voltage control means for proportionately varying the reference voltage levels with which the output signals of the digit reading pair circuits are compared in accordance with the magnitude of the output signal from the reference pair circuit.

In accordance with yet another principal feature of the present invention, said reference voltage control means comprises a resistive voltage divider the total voltage drop across which is equal to the magnitude of the output signal of the reference pair circuit.

In accordance with another feature of the present invention, said reference area may be provided with a standard transmissivity imprint by the same printing operation which provides the digit value imprints at the digit representing areas of the data card, whereby the reference pair and the reference voltage control circuit serve at least in part to compensate for the effects of printing variations from card to card.

In accordance with another feature of the present invention, photoelectric readers for transmissivity-coded cards are provided which are capable of reading four or more digit values (i.e., transmissivity levels) from mass produced cards despite variations of card stock transmissivity from batch to batch, and despite the fact that the code imprints are overlayed with laminations intended to conceal the code from the user and others.

In accordance with a particular aspect of the present invention, transmissivity-coded data card systems are provided which have inexpensive and simple static readers which are not only capable of recognizing spurious cards but also are capable of distinguishing between different classes of cards, whereby access to certain portions of card-controlled premises, such as secret laboratories or executive rest and recreation areas, may be denied to card holders having "lower order" cards.

In accordance with another aspect of the present invention, photoelectric readers are provided which are capable of reading transmissivity-coded security indicia incorporated in existing credit and funds transfer cards during the imprinting step of the normal process of manufacture thereof, whereby existing financial data card systems, and even those in which the financial data is encoded in other than photoelectric manners, may be provided with additional security against the payment of funds in response to the presentation of spurious cards.

In accordance with yet another aspect of the present invention, photoelectric readers for transmissivity-coded data cards are provided which are able to accept and recognize as genuine new cards which are added to a pre-existing set of cards but which are printed on card stock from a different manufacturing batch, without the necessity of replacing the entire set of old cards.

An additional feature of the present invention is the provision of card variation compensating means in photoelectric readers for transmissivity-coded data cards, which compensating means operate on a proportional basis, rather than a subtractive basis, and thus tend to compensate for variations due to aging of the card stock, due to card manufacturing operations, as distinct from card stock manufacturing operations, and due to surface effects such as dirt and scratches normally and unavoidably found in frequently used cards.

In accordance with another aspect of the present invention, photoelectric readers for transmissivity-coded data cards may each be provided with a plurality of reference pairs, each pair juxtaposed to a different reference area of the card, and the output signals of those reference pairs compared by a maximum signal level detecting circuit, whereby the effect of localized dirt on or discoloration of the card upon the reference levels set in accordance with the transmissivity of the reference areas may be reduced or eliminated.

For a fuller understanding of the nature and objects of the invention, reference should be had to the following detailed description taken in connection with the accompanying drawings.

BRIEF DESCRIPTION OF THE DRAWINGS

FIG. 3 is a schematic diagram of a photoelectric card reader embodying the present invention.

DESCRIPTION OF THE PREFERRED EMBODIMENT

Figure 1:
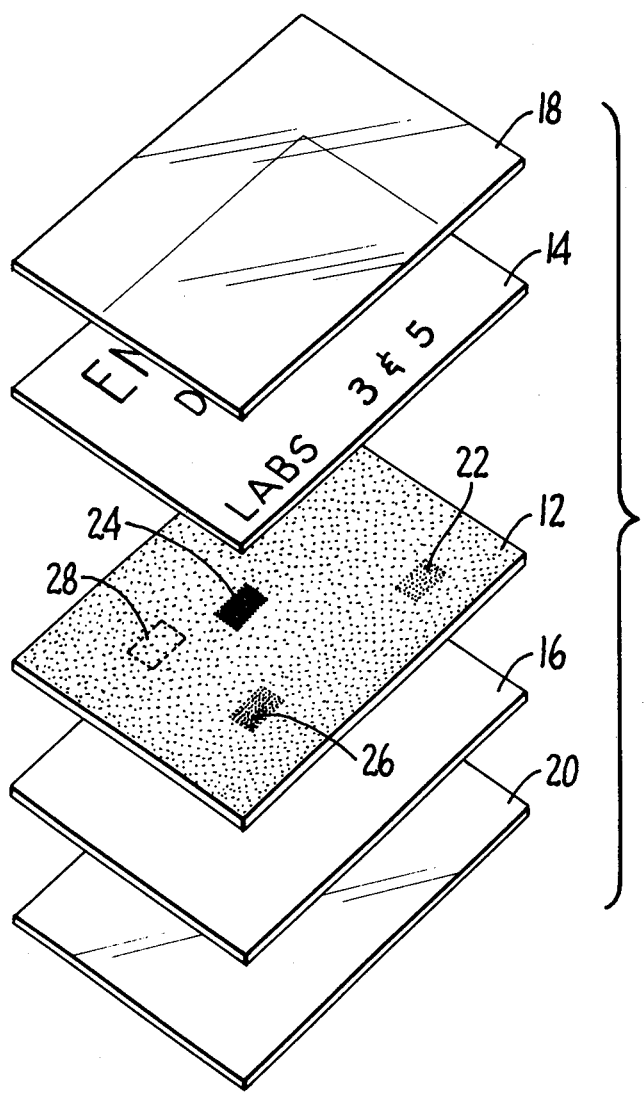
FIG. 1 is an exploded view in perspective of a data card suitable for use in a transmissivity-coded data card system embodying the present invention.

Referring now to FIG. 1, there are shown in exploded view the five laminations of a data card 10 of a type which may be advantageously used in transmissivity-coded data card systems embodying the present invention.

The central lamination 12 of card 10 may, for example, be cut from thin polyvinylchloride (PVC) sheet stock, which in order to best carry out the invention will be pigmented with a dark, e.g., green, pigment.

As also seen in FIG. 1, central lamination 12 is "sandwiched" between two laminations 14 and 16. Laminations 14 and 16 may both be cut, for example, from PVC sheet stock which is sufficiently pigmented with white pigment so that the photoelectrically readable code which is imprinted on the top of central lamination 12 cannot be detected by visual observation of card 10 under reflected light, or by visual observation of card 10 when transilluminated by ordinary, low-intensity room light. In the conventional manner, legends can be printed on the faces of screening laminations 14 and 16 remote from central lamination 12 indicating the identity of the issuing authority, the cardholder, etc. When the present invention is applied to electronic funds transfer (EFT) cards, credit cards, and the like, the legends on the exterior faces of screening laminations 14 and 16 may, of course, also include the identity of the issuing bank or other financial establishment, and the terms and conditions of issuance of the card.

As seen in FIG. 1, card 10 is also provided with two outer laminations 18 and 20, which may be cut from unpigmented, transparent PVC, and are provided for the purpose of protecting the outer faces of screening laminations 14 and 16 from abrasion, which would result in the defacement or complete disappearance of the abovesaid legends imprinted on the outer faces of screening laminations 14 and 16.

In the process of making card 10, the laminations 12, 14, 16, 18, 20 will be sealed together in the well-known manner, in face-to-face relation and in the order and orientation shown in FIG. 1.

When the system of the present invention is used to aid in detecting counterfeit cards of already well-known and existing types, magnetic data tracks may be imprinted on the outside faces of cover laminations 18 and 20, or on one of them. Similarly, when the system of the present invention is used to detect counterfeit cards presented to a reader of an existing, conventional "black-and-white" photoelectric card reading system, then the transmissivity-coded digit representations may be imprinted on the central lamination 12 along with the "black-and-white" time track and associated "black-and-white" data tracks.

Referring again to FIG. 1, it will be seen that a plurality of areas 22, 24, and 26 of the upper face of central lamination 12 are provided with substantially uniform imprints of different density. Each of the areas 22, 24, and 26 represents a digit of a code number identifying card 10, the value of each digit corresponding to the transmissivity of the imprint at the digit representing area.

In accordance with a particular feature of the present invention, the card reader of the preferred embodiment is capable of reading the code number represented by the differing transmissivities of areas 22, 24, and 26 when the imprints over those areas are produced by conventional printing processes, and thus it is not necessary to use special inks, metallic inserts, or the like in preparing card 10.

Further, as may be seen from FIG. 1, it is not necessary to provide a timing track in order to read the code number represented by areas 22, 24, and 26. Thus, the digit representing areas 22, 24, and 26 may be randomly positioned in order to increase the difficulty of "decoding" card 10, or may be arranged to accommodate already existing imprinted patterns in or on existing types of data cards. Further, the ability of the card reader of the present invention to distinguish a large number of transmissivity levels or digit values makes it possible to represent many different numbers by means of a small number of digit representing areas. For example, four digit representing areas, each of which may be imprinted with any one of six transmissivities, may be used to represent 1,296 different card numbers of codes.

In addition to digit representing areas 22, 24, and 26, central lamination 12 also includes a reference area 28 which coacts with a light source-photosensor reference pair in the manner hereinafter described. In the preferred embodiment of the present invention shown and described herein, reference area 28 is not provided with an imprint, as are digit representing areas 22, 24 and 26. It is to be understood, however, that in other embodiments of the present invention, the reference area or areas of the associated cards may be imprinted by the same printing process which provides the imprints at the digit representing areas, and thus compensation may be provided for overall variations in printing density from card to card.

In producing cards for use in the system of the present invention the digit value imprints may be made on the inner faces of one or both of the screening laminations 14, 16, rather than on central lamination 12. When this is done, however, it is desirable to retain the dark-pigmented central lamination 12 in order to make "decoding" of the card as difficult as possible.

Figure 2:
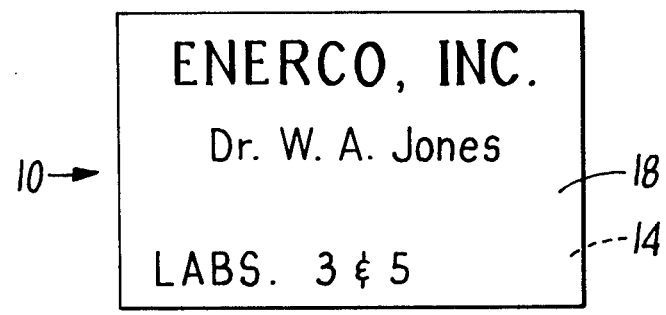
FIG. 2 is a face view of the data card of FIG. 1, showing that the concealed code imprints within the card are not visible to the user in normal use.

Going to FIG. 2, there is shown the face of card 10 when card 10 is in its fully assembled condition. As shown in FIG. 2, the human readable imprint on the outer surface of screening lamination 14 (FIG. 1) is visible through transparent cover lamination 18, but the digit value imprints 22, 24, and 26 are not.

Referring now to FIG. 3, there is shown a reader circuit 30 embodying the present invention. As seen at the left hand edge of FIG. 3, reader 30 comprises four light-emitting diode (LED) light sources 32, 34, 36, 38, and four phototransistors 40, 42, 44, and 46. LED light source 32 cooperates with phototransistor 40 in carrying out the present invention, and these two elements taken together will sometimes hereinafter be referred to as the "reference pair", or the "R pair", for reasons which will become apparent hereinafter. Similarly, LED 34 and phototransistor 42 will be referred to as the "A pair"; LED 36 and phototransistor 44 will be referred to as the "B pair"; and LED 38 and phototransistor 46 will be referred to as the "C pair". As also seen in FIG. 3, card 10 is interposed between the LEDs and the phototransistors of the various pairs. LED 32 transilluminates the reference area 28 of card 10 (FIG. 1). Similarly, LED 34 transilluminates digit representing area 26, LED 36 transilluminates digit representing area 24, and LED 38 transilluminates digit representing area 22. LEDs 32, 34, 36, and 38 are of the same type, and are infrared-emitting LEDs. As shown in FIG. 3, LEDs 32, 34, 36, and 38 are connected in series across a common power supply, and thus the light intensity of all four LEDs will be substantially the same.

All of the phototransistors 40, 42, 44, and 46 are of the same type, adapted for maximum response to infrared radiation of the kind emitted by LEDs 32, 34, 36, and 38. The phototransistors 40, 42, 44, and 46 are all energized from the same supply source, with which they are interconnected in the conventional manner.

As will now be obvious to those having ordinary skill in the art, the emitter current of each phototransistor 40, 42, 44, 46 will be proportional to the percent transmissivity of the area of card 10, and imprint, if any, which is interposed between that phototransistor and its associated LEDs 32, 34, 36, 38.

Since reference area 28 is interposed between the LED and the phototransistor of the R pair, itt will sometimes be called herein the "R area". Similarly, digit representing area 26 will sometimes be called the "A area", digit representing area 24 will sometimes be called the "B area", and digit representing area 22 will sometimes be called the "C area".

In a similar manner, the code imprint over digit representing area 26 will sometimes be called the "A imprint", the code imprint over digit representing area 24 will sometimes be called the "B imprint", and the code imprint over digit representing area 22 will sometimes be called the "C imprint". When embodiments of the present invention in which an encoding imprint is provided over the reference area 28 are discussed, this imprint may be referred to as the "R imprint".

For clarity, elements of reader 30 as shown in FIG. 3 are arbitrarily designated in accordance with LED-phototransistor pair with which they directly cooperate as being in channel A, B, C, or R. Thus, channel A includes the A pair 34, 42, integrated circuit operational amplifier 48 and its feedback resistor 50, and double-ended limit detector 52; channel B includes the B pair, 36, 44, integrated circuit operational amplifier 54 and its feedback resistor 56, and double-ended limit detector 58; and channel C includes the C pair, 38, 46, integrated circuit operational amplifier 60 and its feedback resistor 62, and double-ended limit detector 64. Leads 66, 68, and 70 may be thought of as the output leads of channels A, B, and C, respectively.

Similarly, the R channel includes the R pair, 32, 40, integrated circuit operational amplifier 72 and its feedback resistor 74, and the resistive voltage divider 76.

For clarity, elements included in these channels will sometimes be referred to by their channel designations. Thus, phototransistor 42 may be referred to as the "A phototransistor", double-ended limit detector 58 may be referred to as the "B limit detector", or "B detector", etc.

In these terms, the R phototransistor emitter current in lead 78 will be proportional to the transmissivity of the R area, the A phototransistor emitter current in lead 80 will be proportional to the transmissivity of the A area, the B phototransistor emitter current in lead 82 will be proportional to the transmissivity of the B area, and the C phototransistor emitter current in lead 84 will be proportional to the transmissivity of the C area, when card 10 is correctly located in the card slot of reader 30. The expression "transmissivity of the A area" as used here refers to the percent LED-light transmission of the card stock at the area A times the percent LED-light transmission of the A imprint. Similarly, the expression "transmissivity of the B area" refers to the percent LED-light transmission of the card stock at area B times the percent LED-light transmission of the B imprint. The terms "transmissivity of the R area" and "transmissivity of the C area" are used herein in the same sense.

Integrated circuit operational amplifier 72 and its associated feedback resistor 74 are chosen, in accordance with design procedures well known to those having ordinary skill in the art, so that the voltage at output terminal 86 is proportional to the input current in lead 78. The other operational amplifiers, 48, 54, and 60, and their associated feedback resistors, 50, 56, and 62, are of the same type and resistance value as operational amplifier 72 and feedback resistor 74, and are supplied with the same energizing voltages. Thus, the voltage at terminal 88 is proportional to the input current in lead 80, the voltage at terminal 90 is proportional to the input current in lead 82, and the voltage at terminal 92 is proportional to the input current in lead 84.

Referring again to FIG. 3, and in particular to reference channel R, it will be seen that reference channel R includes a tapped resistor 76 which is provided with seven taps, $a$ through $g$. In the preferred embodiment of the present invention these taps are equally spaced, i.e., the resistance between any pair of adjacent taps is the same as the resistance between any other pair of adjacent taps. It will also be noted that while the upper tap $a$ is located at one extreme of resistor 76, i.e., is directly connected to terminal 86 by lead 94, the bottom tap $g$ is not directly connected to ground, but rather a portion 96 of resistor 76 is interposed between tap $g$ and ground.

The function of tapped resistor 76 is to provide pairs of reference voltage levels with which to compare the A area transmissivity signal at terminal 88, the B area transmissivity signal at terminal 90, and the C area transmissivity signal at terminal 92. The term "transmissivity" as used herein means the numerical value of the ratio between the intensity of the emergent LED-light and the intensity of the impingement LED-light. Thus, if the intensity of the LED-light emerging from the R area is 40% of the intensity of the LED-light falling upon the R area, the transmissivity of the R area is said to be 0.4.

When the term "transmissivity" is thus defined, it will be evident to those having ordinary skill in the art that the transmissivity of an imprinted area of card 10 is equal to the product of the transmissivity of the card stock and the transmissivity of the imprint over that area. It will also be evident to those having ordinary skill in the art that since the LEDs, phototransistors, and operational amplifiers of all of the channels are alike, the proportionality factor between the magnitude of the operational amplifier output signal and the transmissivity of the card area interposed between the LED and the phototransistor will be substantially the same in all channels.

It follows from the above that given card stock whose transmissivity is uniform throughout, the signal at point 88 of channel A will be equal to the signal at point 86 of reference channel R times the transmissivity of the imprint at the A area. Similarly, the signal at point 90 of channel B will be equal to the signal a point 86 times the transmissivity of the B imprint, and the signal at point 92 of channel C will be equally to the signal at point 86 times the transmissivity of the C imprint.

It follows from this that the ratio between the magnitude of the signal at point 88 and the magnitude of the signal at point 86 is equal to the transmissivity of imprint A, and independent of the transmissivity of the card stock. Similarly, the ratio between the magnitude of the signal at point 90 and the magnitude of the signal at point 86 is equal to the transmissivity of imprint B, and independent of the transmissivity of the card stock, and the ratio between the magnitude of the signal at point 92 and the magnitude of the signal at point 86 is equal to the transmissivity of the imprint C, and independent of the transmissivity of the card stock.

While signals corresponding to these ratios can be generated and used to check the authenticity of card 10, and all circuits thus utilizing these ratios fall within the scope of the present invention, this ratio comparison is indirectly but more conveniently and cheaply carried out by the use of tapped resistor 76 and limit detectors 52, 58, and 64, as will now be explained.

As may be seen from FIG. 3, the signal at point 86 is applied directly across tapped resistor 76. It follows, then, from the well-known elementary principles governing the locations of taps on such tapped resistors, that by properly locating a tap on resistor 76 a signal can be tapped off which is equal to the voltage signal at point 86 multiplied by any desired decimal fraction lying between zero and one.

This being so, a tap on resistor 76 may be provided which will produce a signal equal to the signal at point 88, provided only that the ratio between the resistance from that tap to ground and the total resistance of resistor 76 is equal to the transmissivity of imprint A. In the same way, signals equal to the signal at points 90 and 92 can be tapped off at appropriate points of resistor 76.

It is desirable, however, to provide two signals between which the signal at point 88 is expected to lie if card 10 is an authentic card, and such signals may be generated in the same manner by the use of two taps on resistor 76. Pairs of signal bracketing the signals at points 90 and 92 may be provided in the same way.

In the device of the preferred embodiment as shown in FIG. 3, the taps $a$ through $g$ are equally spaced and the resistance between any adjacent pair of taps is equal to the resistance of segment 96. Since the signal at tap $a$, when compared with signals 88, 90 or 92, corresponds to an imprint transmissivity of 1.00, i.e., no imprint, the signal at tap $b$ corresponds to a transmissivity of 0.857, the signal at tap $c$ corresponds to a transmissivity of 0.714, the signal at tap $d$ corresponds to a transmissivity of 0.571, the signal at tap $e$ corresponds to a transmissivity of 0.428, the signal at tap $f$ corresponds to a transmissivity of 0.258, and the signal at tap $g$ corresponds to a transmissivity of 0.142. If, then, the transmissivity of imprint A is approximately 0.928, the magnitude of the signal at point 88 will fall between the voltages on taps $a$ and $b$. Similarly, if the transmissivity of imprint B is approximately 0.499, the magnitude of the signal at point 90 will fall between the voltages at taps $d$ and $e$.

In the preferred embodiment, as illustrated in FIG. 3, the signal at point 88 is compared with the signals at taps $c$ and $d$, the signal at point 90 is compared with the signals at taps *e* and *f,* and the signal at point 92 is compared with the signals at taps *a* and *b,* in order to check the authenticity of card 10. If the transmissivity of imprint A is approximately 0.642, and the transmissivity of imprint B is approximately 0.356, and the transmissivity of imprint C is approximately 0.928, card 10 will be recognized as authentic, and an output signal will result at output terminal 98 of AND gate 100, which output signal is a precondition to the operation of utilization device 102. Utilization device 102, may, for instance, be an actuator for a parking lot entry gate, in which case the signal on lead 98 will serve to immediately open the gate, or utilization device 102 may be a currency dispenser of the well-known kind, in which event the signal on lead 98 will constitute only a partial condition for the dispensing of a packet of currency, and a second signal resulting from keyboard entry of a numerical code known only to the cardholder will be required before the packet of currency will be dispensed.

The means employed in the circuit of FIG. 3 for comparing the tap signals from tapped resistor 76 with signals 88, 90, and 92 are three double-ended limit detectors, 52, 58, 64, of the well-known type. A double-ended limit detector of this type is shown and described in Applications Memo 521/522, at pages 6–67 through 6–70 of the *Signetics Digital Linear MOS Applications Manual,* published by the Signetics Corporation, copyright date 1973.

The circuit elements 104 and 106 are halves of an NE522 dual analog voltage comparator. The NAND gates 108, 110 may be integrated circuit gates of the well-known kind. Double-ended limit detectors 58 and 64 may be substantially identical in construction to double-ended limit detector 52. In the well-known manner, double-ended limit detector 52 produces an H signal on output lead 66 when the magnitude of the signal at point 88 lies between the voltages on taps *c* and *d,* and produces an L signal on output lead 66 when the magnitude of the signal at point 88 lies outside the range defined by the voltages on taps *c* and *d.* Double-ended limit detector 58 similarly produces an H signal on output lead 68 when the magnitude of the signal at point 90 lies between the voltages on taps *e* and *f,* and produces an L signal on output lead 68 when the magnitude of the signal at point 90 does not lie within the range defined by the voltages on taps *e* and *f.* Double-ended limit detector 64, similarly, produces an H signal on output lead 70 when the magnitude of the voltage signal at point 92 lies between the voltages on taps *a* and *b* of tapped resistor 76, and produces an L signal on lead 70 when the magnitude of the voltage signal at point 92 does not lie within the range defined by the voltages at taps *a* and *b.* Thus, it will be seen that an H signal occurs at output terminal 98 of AND gate 100 when and only when card 10 is authentic, in the sense that the transmissivity of imprint A is approximately 0.642, the transmissivity of imprint B is approximately 0.356, and the transmissivity of imprint C is approximately 0.928.

In accordance with an alternative embodiment of the present invention, a plurality of R channels, designated as R1, R2, etc., may be provided, the corresponding R1, R2, etc., areas being distributed over the surface of the card to be read in a randomized manner, or in such manner as to avoid printed areas, magnetic track areas, etc., when the system of the present invention is adapted to add further protection to existing funds transfer or credit cards. The signals from the output terminals of the R1, R2, etc., operational amplifiers are then compared, by means of analog voltage comparator circuits of the well-known type, and the largest of these signals is applied to the end of the tapped voltage divider (corresponding to tapped resistor 76) remote from ground. Thus, this embodiment of the transmissivity-coded data card system of the prior art is rendered substantially free from the effects of localized dirt, scratches, etc., which would tend to adversely affect the accuracy of a system in which the reader or readers was possessed of one R channel, and such localized dirt or scratches fell in the R area.

In accordance with yet another embodiment of the present invention the number of double-ended limit detectors and the number of output AND gates is multiplied and these elements are interconnected in accordance with well-known principles of logic design so that a plurality of output leads is provided and the presence of an H signal on any one of these output leads indicates that a card of corresponding code number has been inserted in the card slot of the reader.

In accordance with a further embodiment of the present invention a reader of the kind shown in FIG. 3 is provided wherein the input reference voltages supplied to at least one double-ended limit detector are derived from non-adjacent taps of tapped resistor. Such a reader will be capable of recognizing as authentic cards having more than one corresponding code numbers. For instance, if the signal at the upper reference voltage input terminal of double-ended limit detector 58 of the reader of FIG. 3 is derived from tap *d* instead of tap *e,* that modified reader will accept as authentic not only cards in which the transmissivity of imprint A is approximately 0.642, the transmissivity of imprint B is approximately 0.356, and the transmissivity of imprint C is approximately 0.928 (called "0.642/0.356/0.925 cards" herein), but will also accept as authentic cards which are similar except that the transmissivity of imprint B is approximately 0.499 (called "0.642/0.499/0.928 cards"). This reader is then a two code reader, in the sense that it will accept both 0.643/0.356/0.928 cards and 0.642/0.499/0.982 cards. By comparison, the reader of FIG. 3 is a one class reader, which accepts only 0.642/0.356/0.928 cards. Similarly, an 0.642/0.499/0.928 one code reader may be provided by deriving the two reference level input voltages of double-ended limit detector 58 from taps *d* and *e.* Readers of the first two types will find useful application when, for instance, it is desired to pass cardholders having both types of cards, i.e., 0.624/0.356/0.982 and 0.642/0.499/0.982 through the main gate of an industrial plant, but to limit access to one laboratory area to holders of 0.642/0.356/0.928 cards. In such an installation, the above-described two code reader will be used to control entry at the main gate, while the 0.642/0.356/0.928 one code only reader will be used to control access to the laboratory.

It will be understood that the term "card" as used herein is used in its broadest acceptation and thus includes, but is not limited to, employee badges, credit cards, wallet cards, key-cards, access cards for persons and vehicles, debit cards, funds transfer cards, personal identification cards, rapid transit tickets, and tax cards, irrespective of whether the code imprints are concealed by outer laminations, and irrespective of the material of the card.

The word "data" as used herein is used in its broadest acceptation, as including, but not limited to, identification code numbers for persons and vehicles, financial data, serial numbers, as for bonds, chronological data, medical data, and tax data. It will further be understood that the scope of the present invention is not limited to cards of any particlar number of digit values or digit representing areas, or to readers having any particular number of digit reading channels or taps on the tapped resistor.

The word "digit" is used herein in its broadest acceptation as denoting an element of a system of notation, and thus is not limited in its denotation to decimal digits or the digits of number systems in general, but rather embraces alpha-numeric and alphabetic characters as well. In this sense, the several transmissivity levels of the code system on which the encoding of a transmissivity-coded data card itself is machine readable only and directly readable by the unaided human eye.

The word "number" is used herein in its broadest acceptation to include ordered sets of digits of any kind, and thus may include words of the English or any other language.

The word "translucent" is used herein in its broadest acceptation, and thus includes card areas which are permeable only to high-intensity or infrared light beyond the visible spectrum or light of a limited range of wavelengths in the visible spectrum.

It will thus be seen that the objects set forth above, among those made apparent from the preceding description, are efficiently attained, and, since certain changes may be made in the above constructions without departing from the scope of the invention, it is intended that all matter contained in the above description or shown in the accompanying drawings shall be interpreted as illustrative, and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A reader for transmissivity-coded data cards each having a plurality of translucent digit representing areas the transmissivities of which correspond to the values of the digits represented and a translucent reference area, comprising:

a plurality of light souces disposed to transilluminate corresponding ones of said areas when one of said cards is in a reading position;

a plurality of photosensors disposed to receive light emerging from corresponding ones of said areas and to produce output currents proportional to the intensity of the received light; and classifying means for classifying data cards positioned in said reading position in accordance with the output currents of the photosensors juxtaposed to said digit representing areas compared with corresponding ranges of percentages of the output current of the photosensor juxtaposed to said reference area.

2. A reader for transmissivity-coded data cards each having a plurality of translucent digit representing areas the transmissivities of which correspond to the values of the digits represented and a translucent reference area, comprising:

a plurality of light sources disposed to transilluminate corresponding ones of said areas when one of said cards is in a reading position;

a plurality of photosensors disposed to receive light emerging from corresponding ones of said areas and to produce output currents proportional to the intensity of the received light;

a plurality of operational amplifier means each receiving the output current of one of said sensors and producing an output voltage proportional to the magnitude of the received output current;

reference voltage signal producing means for producing a plurality of reference voltage signals the magnitude of each of which is a predetermined fraction of the output voltage of the operational amplifier means which receives the output current of the photosensor disposed to receive light emerging from said reference area; and means for comparing the output voltages of the operational amplifier means receiving the output currents of the photosensors disposed to receive light emerging from digit representing areas with said reference voltage signals.

3. A transmissivity-coded data card system, comprising:

a plurality of transmissivity-coded data cards each having a plurality of translucent digit representing areas the transmissivities of which correspond to the values of the digits represented and a translucent reference area;

a plurality of light sources disposed to transilluminate corresponding ones of said areas when one of said cards is in a reading position;

a plurality of photosensors disposed to receive light emerging from corresponding ones of said areas and to produce output currents proportional to the intensity of the received light;

a plurality of operational amplifier means each receiving the output current of one of said photosensiors and producing an output voltage proportional to the magnitude of the received output current;

reference voltage signal producing means for producing a plurality of reference voltage signals the magnitude of each of which is a predetermined fraction of the output voltage of the operational amplifier means which receives the output current of the photosensor disposed to receive light emerging from said reference area; and means for comparing the output voltages of the operational amplifier means receiving the output currents of the photosensors disposed to receive light emerging from digit representing areas with predetermined ones of said reference voltage signals.

4. A transmissivity-coded data card system as claimed in claim 3 in which each of said data cards is comprised of a plurality of translucent laminations and the differences in transmissivity between said digit representing areas is imparted by imprints on at least one of said laminations.

5. A transmissivity-coded data card system as claimed in claim 4 in which each translucent reference area is in a location on its data card which contains no transmissivity-modifying imprint.

6. A transmissivity-coded data card system as claimed in claim 4 in which said translucent reference area is provided with a transmissivitiy-modifying imprint.

7. A transmissivity-coded data card system as claimed in claim 6 in which said transmissivity-modifying reference imprints are made by the same printing operation by which the transmissivity-modifying imprints at said digit representing areas are made.

8. A transmissivity-coded data card system, comprising:

a plurality of transmissivity-coded data cards each having a plurality of translucent digit representing areas the transmissivities of which correspond to the values of the digits represented and a plurality of translucent reference areas;

a plurality of light sources disposed to transilluminate corresponding ones of said areas when one of said cards is in a reading position;

a plurality of photosensors disposed to receive light emerging from corresponding ones of said areas and to produce output currents proportional to the intensity of the received light;

a plurality of operational amplifier means each receiving the output current of one of said photosensors and producing an output voltage proportional to the magnitude of the received output current;

reference voltage signal producing means for producing a plurality of reference voltage signals the magnitude of each of which is a predetermined fraction of the output voltage of the operational amplifier means which receives the output current of the photosensor disposed to receive light emerging from the reference area having the highest transmissivity; and means for comparing the output voltages of the operational amplifier means receiving the output currents of the photosensors disposed to receive light emerging from digit representing areas with predetermined ones of said reference voltage signals.

9. A transmissivity-coded data card system as claimed in claim 8 in which each of said data cards is comprised of a plurality of translucent laminations and the differences in transmissivity between said digit representing areas is imparted by imprints on at least one of said laminations.

10. A transmissivity-coded data card system as claimed in claim 9 in which each translucent reference area is in a location on its data card which contains no transmissivity-modifying imprint.

11. A transmissivity-coded data card system as claimed in claim 9 in which said translucent reference areas are provided with transmissivity-modifying imprints.

12. A transmissivity-coded data card system as claimed in claim 11 in which said transmissivity-modifying reference imprints are made by the same printing operation by which the transmissivity-modifying imprints at said digit representing areas are made.

13. A transmissivity-coded data card system, comprising:

a plurality of transmissivity-coded data cards each having a plurality of translucent digit representing areas the transmissivities of which correspond to the values of the digits represented and a translucent reference area;

a plurality of light sources disposed to transilluminate corresponding ones of said areas when one of said cards is in reading position in a reader;

a plurality of photosensors disposed to receive light emerging from corresponding ones of said areas and to produce output currents proportional to the intensity of the received light;

a plurality of operational amplifier means each receiving the output current of one of said photosensors and producing an output voltage proportional to the magnitude of the received output current;

a tapped resistor connected across the output terminals of the operational amplifier means which receives the output current of the photosensor disposed to receive light emerging from said reference area for producing at its taps a plurality of reference voltage signals; and means for comparing the output voltages of the operational amplifier means receiving the output currents of the photosensors disposed to receive light emerging from digit representing areas with predetermined ones of said reference voltage signals.

14. A transmissivity-coded data card sytem as claimed in claim 13 in which each of said data cards is comprised of a plurality of translucent laminations and the difference in transmissivity between said digit representing areas is imparted by imprints on at least one of said laminations.

15. A transmissivity-coded data card system as claimed in claim 14 in which each translucent reference area is in a location on its data card which contains no transmissivity-modifying imprint.

16. A transmissivity-coded data card system as claimed in claim 14 in which said translucent reference area is provided with a transmissivitiy-modifying imprint.

17. A transmissivity-coded data card system as claimed in claim 16 in which said transmissivity-modifying reference imprints are made by the same printing operation by which the transmissivity-modifying imprints at said digit representing areas are made.

18. A reader for transmissivity-coded data cards as claimed in claim 1, comprising a plurality of classifying means, whereby each of said data cards positioned in said reading position may be classified with respect to several classifications, each of said classifications being defined by a particular set of values of said digits.

19. A reader for transmissivity-coded data cards as claimed in claim 18, further comprising translating means for translating the numbers represented by said ratios into corresponding sets of signals representing the same numbers in a different system of notation.

20. A reader for transmissivity-coded data cards as claimed in claim 19, further comprising display means responsive to said second sets of signals for displaying said numbers in said different system of notation.

* * * * *